United States Patent Office 3,345,360
Patented Oct. 3, 1967

3,345,360
PERFLUORODIAZIRIDINE AND DIMER OF PERFLUOROFORMAMIDINE AND THEIR PRODUCTION
William Charles Firth, Jr., Stamford, Conn., assignor to American Cyanamid Company, Stamford, Conn., a corporation of Maine
No Drawing. Filed June 28, 1962, Ser. No. 207,155
9 Claims. (Cl. 260—239)

This invention relates broadly to a new and useful method of preparing fluorinated compounds and to products thereof, more particularly perfluorodiaziridine and a dimer of perfluoroformamidine. Still more particularly the invention is concerned with the production of such compounds by bringing perfluoroformamidine into reactive relationship with alkali-metal (e.g., rubidium, cesium, potassium, etc.) fluoride or a mixture of such fluorides in any proportions.

Perfluoroformamidine, the formula for which is

I 

and hereafter for brevity often referred to as "PFF," can be obtained, for example, by the fluorination of biguanide using the so-called "fluid-bed" technique as is more fully described in the copending application of Simon Frank and Douglas M. Meyers, Ser. No. 195,023, filed May 11, 1962, and assigned to the same assignee as the present invention. In the method there described 1,1-difluorocyanamide is produced and, ordinarily also, perfluoroformamidine and perfluoroguanidine.

No pertinent prior art is known. Miller et al. [J. Am. Chem. Soc., 83, 1767–8 (1961)] disclose that reaction takes place between cesium fluoride and perfluorodienes at moderate temperatures in the absence of a solvent to yield perfluorodialkylacetylenes.

The properties of a typical sample of perfluoroformamidine are given in Table I.

TABLE 1

| | |
|---|---|
| Molecular weight (by gas density) | Calc'd, 116; found, 116±4. |
| Boiling point | −30±3° C. by extrapolation from log $P_{mm}$=8.63−1370/$T$. |
| Oxidizing power | Found: 31 meq. I⁻/gram. |

F¹⁹ Nuclear Magnetic Resonance Spectrum:

| φ (in p.p.m.) | Appearance | Area Ratio | Assignment |
|---|---|---|---|
| −42.3 | s,¹ Broad | 2 | F₂²NC⟨NF |
| 22.2 | m, Broad | 1 | C=N⟨F |
| 84.2 | s, Sharp, quartet ($J_{NF/CF}$=11±2 cps.). | 1 | =CF− |

¹ s=Strong.
m=Medium.
² Indicates group considered.

The present invention is based on my discovery that perfluorodiaziridine and a dimer of perfluoroformamidine can be produced by bringing perfluoroformamidine into reactive relationship with an alkali-metal fluoride, advantageously cesium, rubidium or potassium fluoride, or mixtures thereof, as briefly described in the first paragraph of this specification and more fully hereafter. The order of activity of the specific fluorides named above in obtaining a maximum yield of dimer of PFF, when other operating conditions are maintained substantially constant, appears to be as follows: (1) CsF; (2) RbF; and (3) KF. Reaction at lower pressure seems to favor a higher yield of perfluorodiaziridine while, with conditions otherwise the same, higher pressures give more of the dimer of PFF. In addition, however, an increase in the amount of alkali-metal fluoride seems to increase the yield of dimer.

The dimer of PFF may exist in one of the following three isomeric forms:

II $$F_2N-CF_2-NF-C\begin{array}{c}F\\ \diagup\\ \diagdown\end{array}NF$$

III 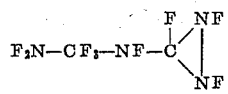

or

IV 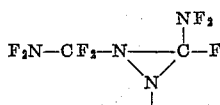

The greater stability of the dimer of PFF in comparison with the stability of PFDA suggests that the dimer obtained is mainly, if not solely, that represented by Formula IV. Depending upon the particular conditions of the reaction, the method also may provide a mixture of two or all three of the isometric forms of the dimer of PFF shown in Formulas II, III and IV.

Typical properties of the dimer of PFF produced by the method of this invention are shown in Table II.

TABLE II.—PROPERTIES OF DIMER OF PFF

| | |
|---|---|
| Vapor pressure | {8 mm. at −43° C. / 38 mm. at −23° C. |
| Boiling point (estimated) | +27° C. |
| Molecular weight | 203 (theory=232). |
| Stability | Stable for one month at −78° C. in trichlorofluoromethane. |

The F¹⁹ nuclear magnetic resonance spectrum of the dimer of PFF resulting from the method of this invention is shown in Table III.

TABLE III.—F¹⁹ NUCLEAR MAGNETIC RESONANCE SPECTRUM OF DIMER OF PFF

| φ (in p.p.m.) | Appearance | Approximate Area Ratio | Assignment |
|---|---|---|---|
| −35.95 | w, Broad | 1 | H−F ⟨C⟨N−F |
| −33.28 | w, Broad | 1 | |
| −21.09 | m | 2 | F₂N−C⟨F |
| +10.46 | w, Broad | 1 | −C−N−C ⟨F |
| +92.9 | s, Sharp (possibly multiplet). | 2 | −N−C−N− ⟨F |
| +150.4 | m, Sharp, doublet (J=ca. 18.3 cps.). | 1 | 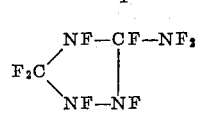 |

The other product that can be obtained in substantial quantity, in addition to a dimer of PFF, when PFF is brought into reactive relationship with an alkali-metal fluoride (especially RbF, CsF or KF, or mixtures thereof) is an isomer of PFF. The spectrum of this isomer shows that two types of fluorine are present in equal amounts. The $+32\phi$ resonance is in the N—F region, but appears to be at too high a field to be due to an $NF_2$ group. The $+120\phi$ resonance is in the C—F region. This spectrum together with the infrared spectrum, which shows no C=N band, strongly indicates that of the three structures or formulas shown below, the cyclic diaziridine, viz., perfluorodiaziridine (Formula VII) is most likely.

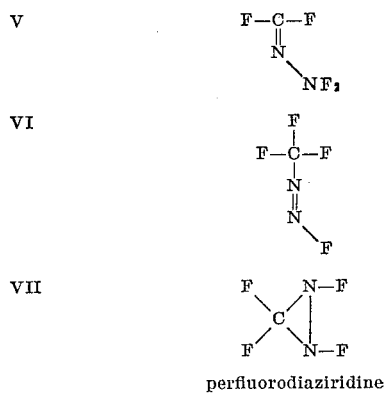

perfluorodiaziridine

The $F^{19}$ nuclear magnetic resonance spectrum of the isomer of PFF obtained by the method of this invention is given in Table IV.

TABLE IV.—$F^{19}$ NUCLEAR MAGNETIC RESONANCE SPECTRUM OF ISOMER OF PFF

| $\phi$ (in p.p.m.) | Appearance | Area Ratio | Assignment |
|---|---|---|---|
| +32.01 | w, Broad | 1 | N—F / C / N—F |
| +119.9 | s, Sharp | 1 | F\\N— / C / F/ N— |

The infrared spectrum of the isomer of PFF has symmetric and asymmetric $CF_2$ stretching vibrations at wave lengths unusually low for saturated C—N—F compounds. It also has a characteristic band at about $11.1\mu$ which it seems reasonable to assign to the N—F group.

Any suitable means can be employed in bringing the perfluoroformamidine reactant into contact with the alkali-metal fluoride reactant. Good results have been obtained by bringing the PFF into contact with the alkali-metal fluoride while the former is in liquid state and then allowing it to reach ambient temperature (room temperature), e.g., 20°–30° C., or even about 40° C. Thus, the temperature of reaction may range, for example, from about −160° C. to ambient temperature.

If desired, gaseous PFF can be passed upwardly or downwardly through a bed of alkali-metal fluoride in divided state or form. Or, it may be passed through a plurality of inlet ports or openings whereby the gaseous PFF reactant is introduced at a plurality of points into a bed of the alkali-metal fluoride contained in a suitable reactor, and the gaseous products of the reaction are withdrawn from the reactor along with any unconverted PFF. The reaction can be effected continuously, semi-continuously or by batch technique, and at atmospheric or superatmospheric pressure.

The alkali-metal fluoride may be of any suitable size or shape, for example in finely divided state such as of from 50 to 100-mesh fineness; or in the form of larger particles (coarser than 50-mesh), beads, pellets, etc.

The time of contact of the PFF reactant with the alkali-metal fluoride reactant can be varied as desired or as conditions may require depending, for example, upon such influencing factors as, for instance, the design of the reactor; whether or not the operation is continuous, semi-continuous or batch; the size, shape, surface area, etc., of the alkali-metal fluoride; temperature and/or pressure at which the reaction is effected; and other influencing conditions. For example, when the reaction is carried out continuously with the PFF in the gaseous state the time of contact may be from less than a minute (e.g., about ¼ minute) to 10 or 15 minutes or more. In batch operations the contact time may range, for instance, from 10 or 15 minutes to 24 hours or more.

Usually it is advantageous that the alkali-metal fluoride be in anhydrous (substantially completely anhydrous) state. By "anhydrous" alone or "substantially completely anhydrous" as used herein with reference to the alkali-metal fluoride reactant is meant one which contains no more than a trace of water or the amount of water that might be present in the commercial product. The amount of water should not be such as would adversely affect the course of the reaction or the constitution of the reaction product.

The amount of the alkali-metal fluoride ingredient or reactant with respect to the PFF reactant is not critical, and may be varied as desired or as conditions may require, for example to increase the yield of one product with respect to another. The alkali-metal fluoride functions as a conversion catalyst.

If desired, the PFF reactant may be diluted with an inert material, e.g., an inert carrier material in gaseous or other state. Examples of such diluents that can be used are, for instance, helium, argon, nitrogen, neon, bis(difluoroamino)difluoromethane, etc. The concentration of the PFF in the diluent can be varied as desired or as conditions may require, e.g., from 1:99% by volume of PFF to 99:1% by volume of the diluent material.

In order that those skilled in the art may better understand how the present invention can be carried into effect, the following examples are given by way of illustration and not by way of limitation. All parts and percentages are by weight unless otherwise indicated.

*Example 1*

A dry 148-ml. reactor was charged in a dry box with 1.0 g. of anhydrous rubidium fluoride, evacuated and 0.19 mmole of perfluoroformamidine (PFF) was condensed in with a −132° C. bath. The reactor was isolated from the rest of the vacuum system and allowed to warm to room temperature (20°–30° C.) over 10 to 15 minutes. After 19 hours at room temperature the product gas consisted mainly of perfluorodiaziridine (PFDA), VIII 

together with some dimer of PFF.

In another series of runs the work-up procedure was as follows: At the end of the period of reaction, the total gaseous product was measured and then separated in a vacuum U-train into −119° C. (ethyl bromide slush) and −160° C. (isopentane slush) condensates. During fractionation, the −160° C. trap was pumped on to remove any non-condensables that may have been present. A −132° C. bath was used for condensations of the −119° C. condensates, which were substantially pure dimer of PFF as evidenced by infrared analyses and Cady et al. fractional co-distillations [G. H. Cady and D. P. Siegworth, Anal. Chem., 31, 618 (1959)].

The explosive risk in vaporizing PFDA was reduced, as in Example 3, by adding a substance such as 1,2 mmoles of trichlorofluoromethane (Freon® 11) to the −160° C. condensate (still at −160° C.). The resulting mixture was distilled from a −119° C. bath into a bulb at −160° C. This mixture was stored at −78° C. when not being manipulated. Infrared and $F^{19}$ NMR spectra of the aforesaid mixture showed that the −160° C. condensate was substantially pure PFDA, although traces of impurities were present.

The "work-up" of the −160° C. condensate of Examples 2 and 4 was the same as described above with the exception that the Freon® 11 was omitted.

The reaction conditions and results are summarized in Table V.

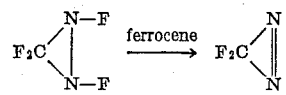

In a similar reaction when the dimer of PFF was substituted for PFDA, an immediate reaction occurred as evidenced by the formation of a dark green color. After about 20 minutes, the volatile product consisted of about a 25% recovery of pure PFF. The non-volatile material comprised a complex mixture of reaction products and were not identified.

As will be understood by those skilled in the art, the chemical structures of PFDA and the dimer of PFF sug-

TABLE V

| Example | Mmoles PFF [1] | Grams RbF | Reaction Time | Pressure in Reactor (calc'd), mm. | Decrease in mmoles of gas | Dimer of PFF (mmoles/percent) | PFDA [2] (mmoles/percent) |
|---|---|---|---|---|---|---|---|
| 2 | 1.3 | 5.0 | 3 hrs | 484 | 0.43 | [3] 0.37/57 | [3] 0.38/29 |
| 3 | 0.72 | 5.0 | 3 hrs | 499 | 0.24 | 0.14/39 | [4] 0.20/28 |
| 4 | 0.94 | 5.0 | 3½ hrs | 33 | 0.12 | 0.05/11 | 0.7/74 |
| 5 | 0.20 | 5.0 | 13 min | 17 | 0.09 | Largely PFF dimer; small amount of PFDA; and unreacted PFF. | |
| 6 | 0.20 | 1.0 | 20 min | 28 | Undetermined | PFDA; some PFF dimers; and unreacted PFF. | |

[1] PFF = Perfluoroformamidine.
[2] PFDA = Perfluorodiaziridine.
[3] IR shows only a small amount of impurities to be present.
[4] Handled as a mixture with Freon® 11.

*Example 7*

The same apparatus and general procedure were employed as described in the preceding examples. PFF (0.94 mmole) was condensed in a dry reactor containing 5.0 g. anhydrous CsF. The reactor was isolated and the cooling bath (−160° C.) was removed. The calculated pressure in the reactor was 118 mm. Hg. The reaction time was 17 minutes at the end of which time the reactor warmed from −160° C. to 20°-30° C. and the decrease in mmoles of gas was 0.46 mmole. The gaseous product was almost entirely (over 90% yield) a dimer of PFF. Infrared examination showed a weak absorption at 62μ.

*Example 8*

Into a reactor containing 5.0 g. anhydrous KF and surrounded by a −160° C. cooling bath was condensed 1.1 mmoles of PFF. The calculated pressure in the reactor in mm. Hg was 135 mm. After standing for about 17 hours at room temperature, the gaseous product was separated by fractional co-distillation in known manner using −132° C. baths to trap the product. Infrared examination of the product showed it to be a mixture of a dimer of PFF and perfluorodiaziridine (PFDA).

*Example 9*

Same as in Example 8 with the exception that there was charged to the reactor 1.6 mmoles of a mixture of about 1.3 mmoles of PFF and about 0.5 mmole of bis(difluoroamino)difluoromethane, which acts as an inert diluent. The calculated pressure in the reactor in mm. Hg was 134 mm. The gaseous product was separated as in Example 8. The product consisted mainly of a dimer of PFF and a small amount of PFDA.

In all of the foregoing examples the alkali-metal fluoride employed was in finely divided state.

Perfluorodiaziridine (PFDA) and the dimer of perfluoroformamidine are useful, for example, as intermediates in chemical synthesis. For example, when PFDA was reacted slowly with a paste of ferrocene in the tetramer of chlorotrifluoroethylene, the main product was $CF_2N_2$, which was identified by infrared examination. The reaction can be illustrated by the following abbreviated equation:

gests the utility of these compounds as fluorinating agents, as oxidizers, or as intermediates in the synthesis of other oxidizers.

I claim:
1. A compound selected from the group consisting of perfluorodiaziridine and the dimer of perfluoroformamidine.
2. The dimer of perfluoroformamidine.
3. Perfluorodiaziridine.
4. The method of preparing fluorinated compounds including at least one member of the group consisting of perfluorodiaziridine and the dimer of perfluoroformamidine, said method comprising reacting together perfluoroformamidine and an alkali-metal fluoride.
5. A method as in claim 4 wherein the alkali-metal fluoride is rubidium fluoride.
6. A method as in claim 4 wherein the alkali-metal fluoride is cesium fluoride.
7. A method as in claim 4 where in the alkali-metal fluoride is potassium fluoride.
8. A method as in claim 4 wherein the reaction mass is at a temperature ranging from −160° C. to ambient temperature during the reaction period.
9. The method of preparing fluorinated compounds including at least one member of the group consisting of perfluorodiaziridine and the dimer of perfluoroformamidine, said method comprising reacting together perfluoroformamidine and an alkali-metal fluoride at a temperature ranging from −160° C. to ambient temperature during the reaction period; and isolating from the resulting reaction mass at least one member of the aforementioned group.

References Cited

UNITED STATES PATENTS 3,228,936  1/1966  Davis et al. _____ 260—249.6

OTHER REFERENCES

Hoffman et al.: Chem. Reviews, vol. 62, pp. 12–18 (1962).

ALTON D. ROLLINS, *Primary Examiner.*

L. D. ROSDOL, *Examiner.*

J. W. WHISLER, *Assistant Examiner.*